United States Patent
Ford et al.

(10) Patent No.: US 10,336,236 B2
(45) Date of Patent: Jul. 2, 2019

(54) BOTTOM LOADING VALVES, TANK MANAGEMENT SYSTEMS INCORPORATING THE SAME, AND METHODS FOR MANAGING TANKS

(71) Applicant: Eaton Corporation, Cleveland, OH (US)

(72) Inventors: Tyler Ford, Newport Beach, CA (US); Landry Master, Goleta, CA (US); Chris Warnes, Garden Grove, CA (US); Evan Mengstab, Laguna Beach, CA (US); Peter Buffkin, Desoto, KS (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 96 days.

(21) Appl. No.: 15/118,361

(22) PCT Filed: Feb. 11, 2015

(86) PCT No.: PCT/US2015/015415
§ 371 (c)(1),
(2) Date: Aug. 11, 2016

(87) PCT Pub. No.: WO2015/123296
PCT Pub. Date: Aug. 20, 2015

(65) Prior Publication Data
US 2017/0174116 A1    Jun. 22, 2017

Related U.S. Application Data

(60) Provisional application No. 61/938,765, filed on Feb. 12, 2014.

(51) Int. Cl.
*B67D 7/36* (2010.01)
*G05D 9/12* (2006.01)
(Continued)

(52) U.S. Cl.
CPC ............. *B60P 3/2245* (2013.01); *B60P 3/225* (2013.01); *B65D 88/544* (2013.01); *B67D 7/362* (2013.01);
(Continued)

(58) Field of Classification Search
CPC . F16K 3/24; F16K 3/246; F16K 3/314; F16K 3/32; F16K 11/07; F16K 27/07;
(Continued)

(56) References Cited

U.S. PATENT DOCUMENTS 3,145,968 A    8/1964   Marx
3,149,642 A *  9/1964   Marx ...................... F16K 27/07
                                                              137/326
(Continued)

FOREIGN PATENT DOCUMENTS

FR    428171 A  *  8/1911   ............... F16K 3/22
GB    1071650 A *  6/1967   ............. B67D 7/362
GB    1233611      5/1971

OTHER PUBLICATIONS

International Search Report from PCT/US2015/015415 dated Aug. 17, 2015, 15 pages.

*Primary Examiner* — Reinaldo Sanchez-Medina
*Assistant Examiner* — Hailey K. Do
(74) *Attorney, Agent, or Firm* — Benesch, Friedlander, Coplan & Aronoff LLP

(57) ABSTRACT

According to the embodiments described herein, a bottom loading valve can include a drive member, a valve body, and a piston. The drive member can be operably coupled to a motor. The valve body can define a fluid passageway and one or more lateral openings. The drive member can be positioned within the fluid passageway. The one or more lateral openings can be offset laterally from the drive member. The piston can be engaged with the drive member. The (Continued)

piston can move throughout an open position and a closed position, as the drive member communicates force from the motor. When the piston is in the closed position, the piston can fully obstruct the one or more lateral openings from the fluid passageway.

10 Claims, 8 Drawing Sheets

(51) Int. Cl.
*B65D 88/54* (2006.01)
*B60P 3/22* (2006.01)
*F16K 37/00* (2006.01)
*F16K 31/50* (2006.01)
*F16K 31/54* (2006.01)
*F16K 3/24* (2006.01)
*F16K 3/314* (2006.01)
*F16K 31/04* (2006.01)

(52) U.S. Cl.
CPC .............. *F16K 3/246* (2013.01); *F16K 3/314* (2013.01); *F16K 31/04* (2013.01); *F16K 31/508* (2013.01); *F16K 31/54* (2013.01); *F16K 37/0041* (2013.01); *G05D 9/12* (2013.01)

(58) Field of Classification Search
CPC ..... F16K 31/508; B65D 88/54; B65D 88/544; B67D 7/362; Y10T 137/86324; Y10T 137/86791; Y10T 137/7303; Y10T 137/7306; G05D 9/00; G05D 9/12
See application file for complete search history.

(56) References Cited

U.S. PATENT DOCUMENTS

| | | | | |
|---|---|---|---|---|
| 3,771,549 | A * | 11/1973 | Lemon | B67D 7/362 137/393 |
| 6,082,392 | A * | 7/2000 | Watkins, Jr. | B67D 7/002 137/312 |
| 6,244,289 | B1 * | 6/2001 | Hopfe | F16K 24/04 137/197 |
| 2004/0123908 | A1 | 7/2004 | Tiziani et al. | |
| 2011/0000203 | A1 * | 1/2011 | Riedel | F15B 11/163 60/327 |

* cited by examiner

BOTTOM LOADING VALVES, TANK MANAGEMENT SYSTEMS INCORPORATING THE SAME, AND METHODS FOR MANAGING TANKS

CROSS-REFERENCE TO RELATED APPLICATIONS

This application is a National Stage of International Application No. PCT/US2015/015415, filed Feb. 11, 2015, which claims the benefit of U.S. Provisional Application No. 61/938,765, filed Feb. 12, 2014.

BACKGROUND

The present disclosure relates to a bottom loading valve and tank management system for use on-loading and off-loading fuel on commercial trucking vehicles. Specifically, the disclosure relates to a bottom loading valve and a tank management system that may be electrically operated in order to efficiently add and remove fuel from fuel tanks.

Many fuel tank refueling and defueling systems for large or commercial scale trucks require an air source to operate a bottom loading valve and tank vent valve simultaneously during fueling operations. These valves combine to prevent collapse or rupture of the tank as well as provide the ability to monitor fueling rates and pressures. Many of these systems require primary and secondary air sources with associated tubing and brackets. These systems can be complicated to install and maintain and can fail in cold weather conditions because the pumps that actuate the valves may have difficulty starting in extreme conditions (below 10° F.). It would be beneficial to simplify the installation of these systems and improve reliability in cold weather conditions.

SUMMARY

According to the embodiments described herein, an electrically operated tank management system can include a bottom loading valve and vent valve for use in fueling and refueling a tank that are electrically actuated. The bottom loading valve can include a valve body, a motor, a cylinder, and a piston; the piston is configured to be moved from a closed position to an open position by rotating a lead screw drive attached to both the piston and the motor.

In one embodiment, a bottom loading valve can include a drive member, a valve body, and a piston. The drive member can be operably coupled to a motor. The valve body can define a fluid passageway and one or more lateral openings. The drive member can be positioned within the fluid passageway. The one or more lateral openings can be offset laterally from the drive member. The piston can be engaged with the drive member. The piston can move throughout an open position and a closed position, as the drive member communicates force from the motor. When the piston is in the closed position, the piston can fully obstruct the one or more lateral openings from the fluid passageway.

In another embodiment, a tank management system can include a tank surrounding an interior, a vent valve, and a bottom loading valve. The vent valve can be coupled to the tank. The vent valve can actuate throughout a venting position and a non-venting position. The vent valve can communicate a vent position signal indicative of actuation of the vent valve. The bottom loading valve can be coupled to the tank. The bottom loading valve can include a valve body and a motor. The valve body can define a fluid passageway and one or more lateral opening. The motor can move a piston throughout an open position and a closed position. When the piston is in the closed position, the piston can fully obstruct the one or more lateral openings from the fluid passageway.

In a further embodiment, a method for operating a bottom loading valve or a tank management system can include rotating a drive member within a fluid passageway and around an axis of rotation. In response to rotation of the drive member, a piston engaged with the drive member can be translated throughout an open position and a closed position. The piston can be confined within a valve body that defines one or more lateral openings. The one or more lateral openings can be offset laterally from the axis of rotation. When the piston is in the closed position, the piston can fully obstruct the one or more lateral openings from the fluid passageway.

According to any of the bottom loading valves, systems or methods described herein, the drive member can be in fixed and rotatable engagement with the valve body. The drive member can rotate around an axis of rotation. Alternatively or additionally, the drive member can be in threaded engagement with the piston.

According to any of the bottom loading valves, systems or methods described herein, a position detector can be mounted to the motor. The position detector can include a disk that is attached to the drive member and an optical reflective sensor located proximate the disk. Alternatively or additionally, the disk can be indexed with a plurality of through holes.

According to any of the bottom loading valves, systems or methods described herein, the drive member can include a pinion operably coupled to the motor and a rack engaged with the piston. The motor can rotate the pinion to translate the rack and the piston.

According to any of the bottom loading valves, systems or methods described herein, the valve body can include a cylindrical portion. The one or more lateral openings can be formed in the cylindrical portion of the valve body. Alternatively or additionally, the valve body can include an exterior flange coupled to a fluid port, and an interior flange coupled to the cylindrical portion. The exterior flange and the interior flange can be configured to cooperate to clamp a tank.

According to any of the bottom loading valves, systems or methods described herein, the piston can include a hub configured to receive force from the motor, and a sealing member that forms a substantially cylindrically shaped outer rim that is concentric to the hub. The sealing member of the piston can fully obstruct the one or more lateral openings from the fluid passageway, when the piston is in the closed position. Alternatively or additionally, the piston can include low drag spokes that couple the hub and the sealing member. Alternatively or additionally, the low drag spokes can be tapered as the low drag spokes extend away from a first end of the piston towards a second end of the piston.

According to any of the bottom loading valves, systems or methods described herein, the bottom loading valve can include a spring for biasing the bottom loading valve to the closed position.

According to any of the bottom loading valves, systems or methods described herein, the controller can be communicatively coupled to the vent valve and the bottom loading valve. The controller can execute machine readable instructions to cause the vent valve to actuate to the venting position. The vent position signal can be received by the controller. The controller can determine that the vent valve is in the venting position from the vent position signal. The controller can cause the piston of the bottom loading valve to move to the open position after the vent valve is determined as being in the venting position. Alternatively or additionally, the controller can execute the machine readable instructions to cause the piston of the bottom loading valve to move to the closed position. The controller can cause the vent valve to actuate from the venting position to the non-venting position a predetermined amount of time after the piston of the bottom loading valve is moved to the closed position. Alternatively or additionally, a fuel level sensor can be communicatively coupled to the controller. The controller can execute machine readable instructions to receive a fuel level signal from the fuel level sensor that is indicative of an amount of fuel contained by the tank. The controller can determine that the tank has additional capacity. The piston of the bottom loading valve can be moved to the open position after the additional capacity is determined. Alternatively or additionally, a pressure sensor can be disposed upstream of the bottom loading valve and communicatively coupled to the controller. The controller can execute machine readable instructions to receive a pressure signal from the pressure sensor indicative of an upstream pressure. The controller can determine that a pressure check is satisfied when the upstream pressure meets a minimum threshold pressure. The controller can move the piston of the bottom loading valve to the open position after the pressure check is satisfied. Alternatively or additionally, the controller can execute machine readable instructions to cause the piston of the bottom loading valve to move to the closed position. The controller can cause the vent valve to actuate from the venting position to the non-venting position a predetermined amount of time after the piston of the bottom loading valve is moved to the closed position.

According to any of the bottom loading valves, systems or methods described herein, a controller can be communicatively coupled to the vent valve and the bottom loading valve. The controller can execute machine readable instructions to cause the vent valve to actuate from the non-venting position to the venting position. The controller can cause the piston of the bottom loading valve to move from the closed position to the open position contemporaneously to actuation of the vent valve.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The embodiments described herein generally relate to a bottom loading valve that can be utilized to regulate the on-loading and offloading of fuel. The bottom loading valve can define a fluid passageway for the flow of fluid and can comprise a piston that can be actuated throughout an open and a closed position. Further embodiments relate to a tank management system that can comprise the bottom loading valve and a vent valve that can function cooperatively with the bottom loading valve during operation of a tank that stores fluids such as, for example, a fuel tank. Various embodiments of the tank management system, the bottom loading valve and their operation is described in more detail herein.

Figure 1:
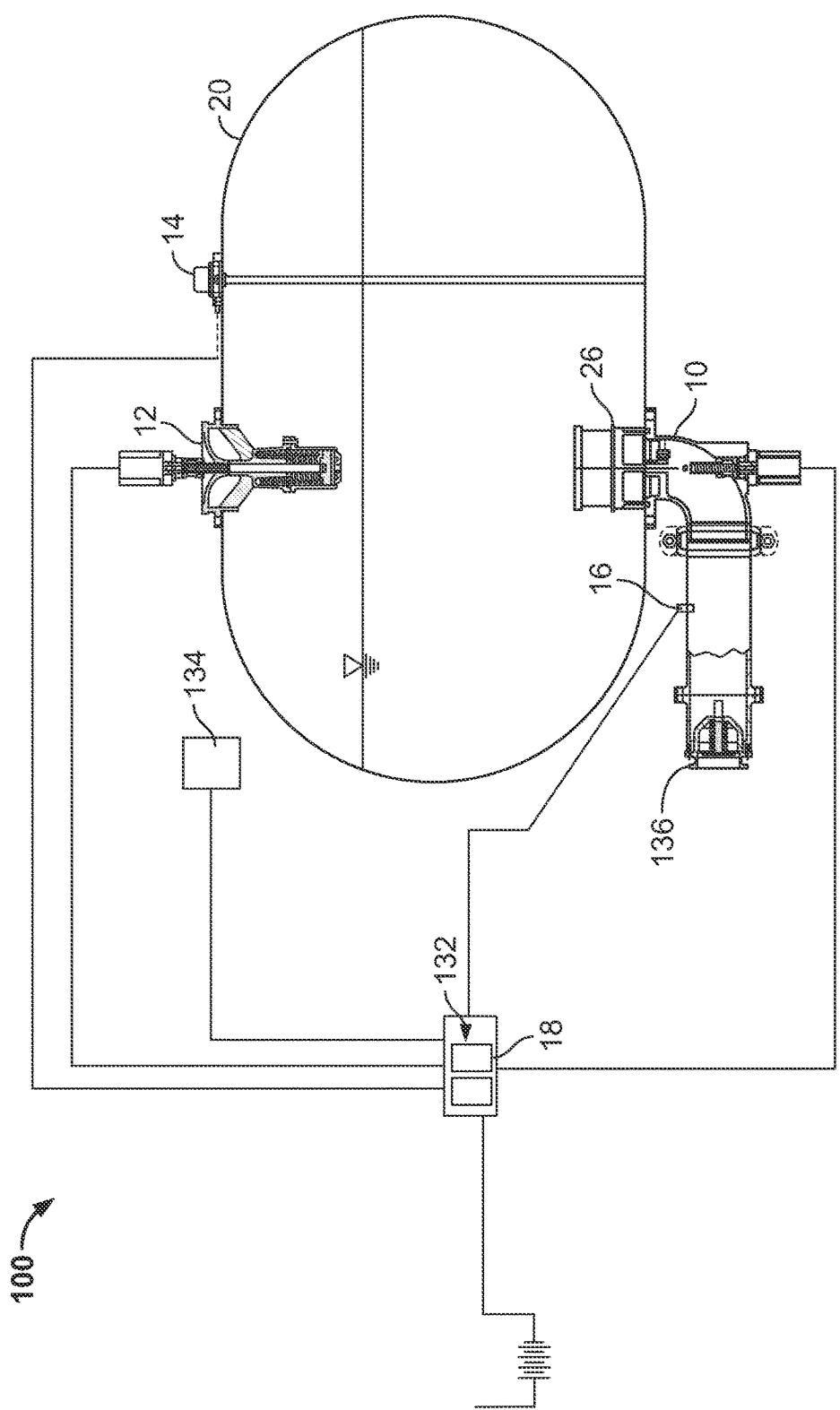
FIG. 1 is a schematic representation of a tank management system.

Referring now to FIG. 1, an embodiment of the tank management system 100 is schematically depicted. The system 100 can comprise a bottom loading valve 10 that can be actuated throughout an open and a closed position to regulate the flow of a fluid. For the purpose defining and describing the present disclosure, it is noted that the term "fluid" as used herein can mean a substance, such as a liquid or a gas, that is capable of flowing and that changes its shape when acted upon by a force tending to change its shape.

Figure 2:
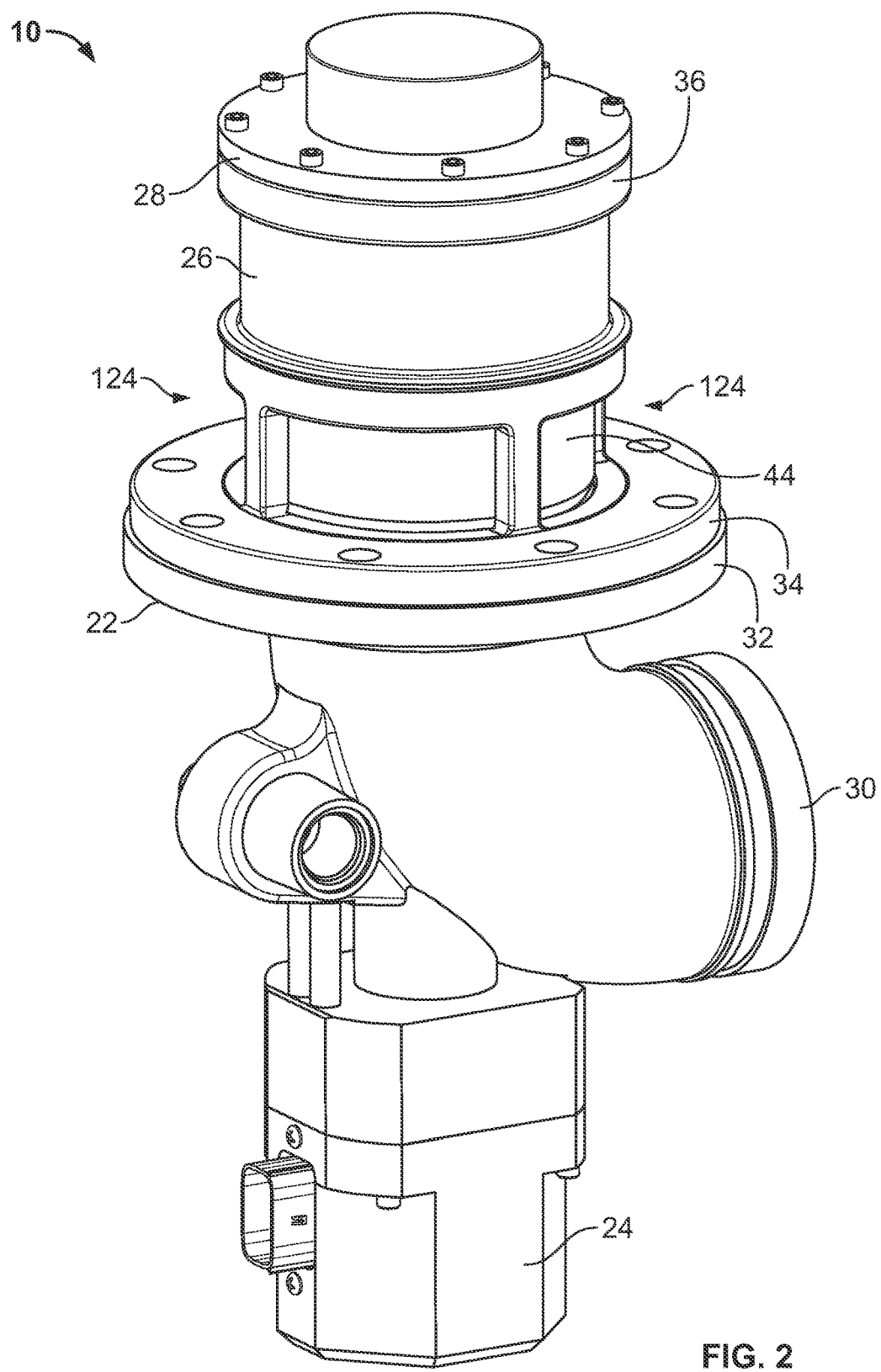
FIG. 2 is a perspective view of a bottom loading valve for use in the tank management system.
Figure 3:
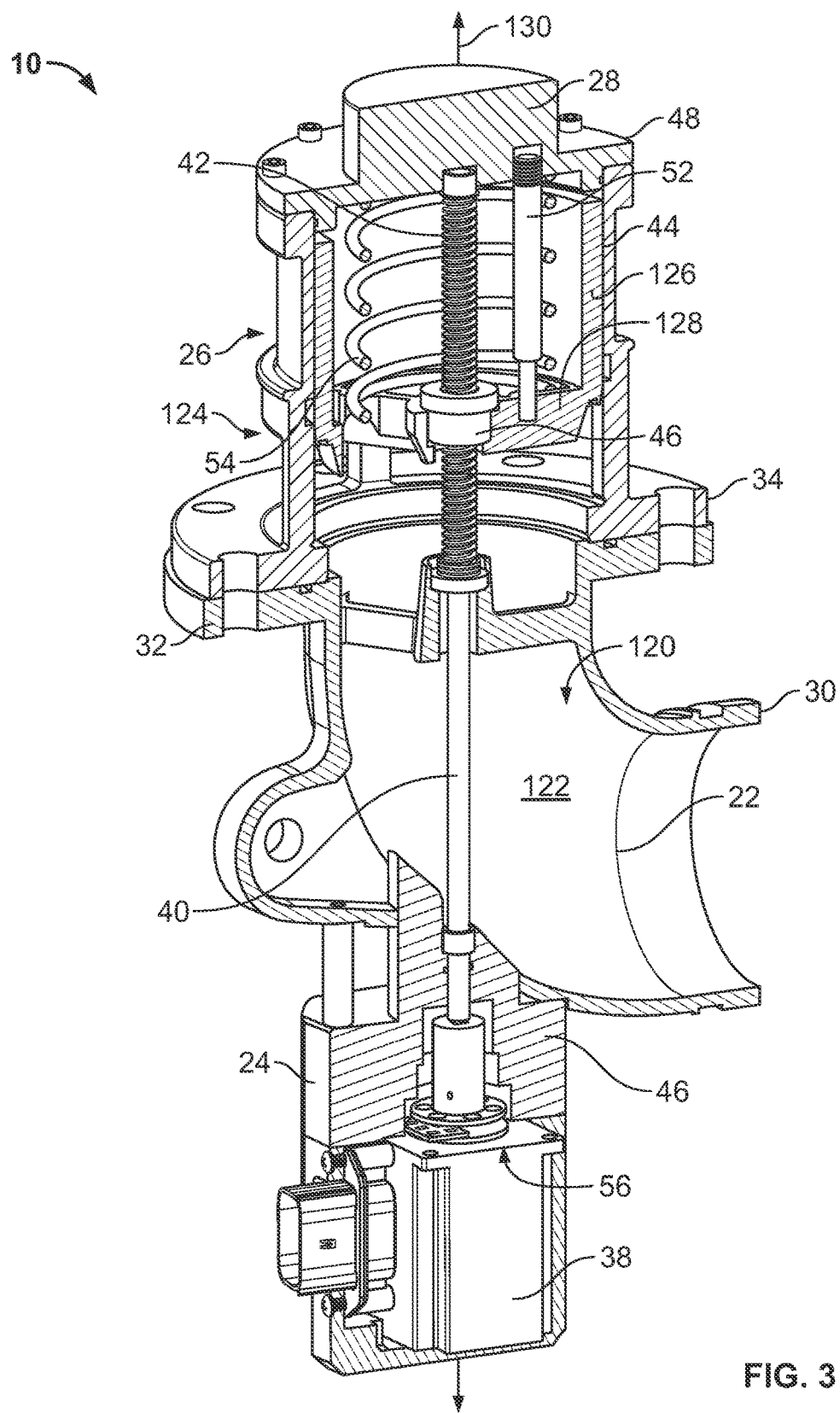
FIG. 3 is a cross-sectional view of the bottom loading valve of FIG. 2.

Referring collectively to FIGS. 2 and 3, the bottom loading valve 10 can comprise a valve body 22 that defines a fluid passageway 120 for delivering fluid (e.g., fuel) through the bottom loading valve 10. Specifically, the fluid passageway 120 can be bounded by a fluid facing surface 122 formed within the valve body 22. The valve body 22 can comprise a cylindrical portion 26 that defines a fluid regulating port for the passage of fluid into the bottom loading valve 10, out of the bottom loading valve 10, or both. In some embodiments, one or more lateral openings 124 can be formed through the cylindrical portion 26 of the valve body 22 for the passage of fluid.

The bottom loading valve 10 can comprise a motor 38 for actuating the bottom loading valve 10 throughout a closed position (FIG. 2) and an open position (FIG. 3). The motor 38 can be any servo-mechanism suitable for providing motive force such as, for example, an electric motor, a stepper motor, or the like. In some embodiments, the motor 38 can be operably coupled to drive member 40 that is configured to communicate force from the motor 38 to other components of the bottom loading valve 10. For example, the drive member 40 can comprise a drive shaft or rod that is engaged with the motor 38 and configured to communicate rotational motion of the motor 28. Specifically, the drive member 40 can be engaged with the motor 38 at a first end and extend to a second end. The drive member 40 can comprise a threaded portion 42 located proximate to the second end of the drive member 40. In one embodiment, the threaded portion 42 of the drive member 40 can comprise a high efficiency lead screw.

Figure 4:
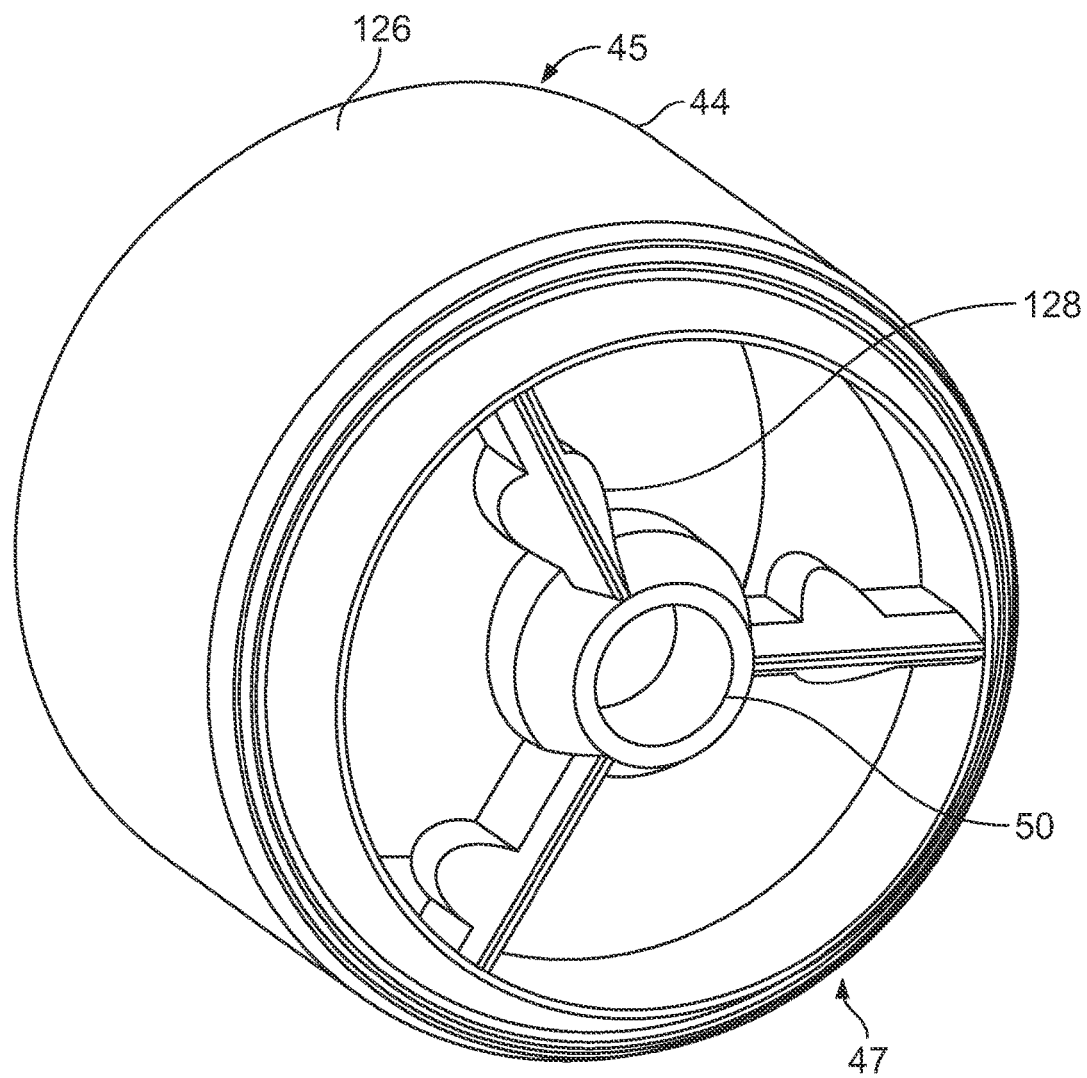
FIG. 4 is a perspective view of a piston for use in the bottom loading valve of FIG. 2.

Referring collectively to FIGS. 3 and 4, bottom loading valve 10 can comprise a piston 44 configured to move within the bottom loading valve 10 to regulate the flow of fluid throughout the bottom loading valve 10. The piston 44 can comprise a hub 50 that is configured to receive force from the motor 38. In some embodiments, the piston 44 can comprise a sealing member 126 that extends between a first end 45 and a second end 47 of the piston 44. The hub 50 can be coupled to the sealing member 126 via low drag spokes 128. In the depicted embodiment, the sealing member 44 can form a substantially cylindrically shaped outer rim that is concentric to the hub 50. The low drag spokes 128 can span from the hub 50 to the sealing member 44. Accordingly, the low drag spokes 128, the hub 50, and the sealing member 44 can cooperate to define a plurality of pressure balancing orifices. The pressure balancing orifices can allow fluid to flow between the low drag spokes 128, the hub 50, and the sealing member 44.

In some embodiments, the low drag spokes 128 can be shaped to reduce the drag of the piston 44. For example, the low drag spokes 128 can be shaped to reduce the amount of friction between the piston 44 and a fluid located in the fluid passageway 120 as the piston 44 moves towards the closed position (FIG. 2). Specifically, the low drag spokes 128 can be tapered as the low drag spokes 128 extend away from the first end 45 of the piston 44 towards the second end 47 of the piston 44. That is, the cross-sectional area of the low drag spokes 128 can be reduced as the low drag spokes 128 extend away from the first end 45 of the piston 44 towards the second end 47 of the piston 44.

Figure 5:
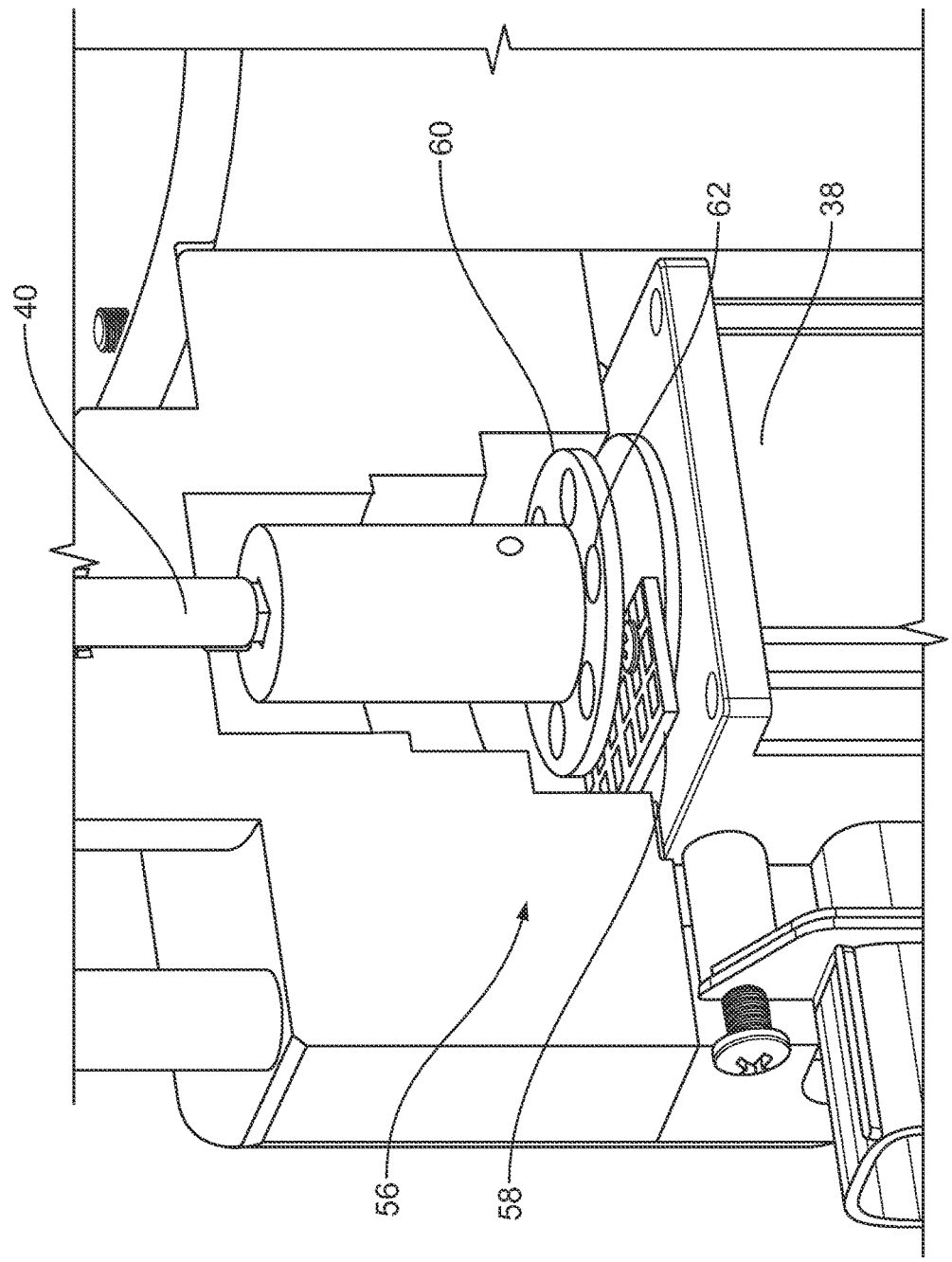
FIG. 5 is a perspective view of an position detector for use in the bottom loading valve of FIG. 2.

Referring now to FIG. 5, the bottom loading valve 10 can comprise a position detector 56 configured to detect motion of the motor 58 and transform the motion into a data signal. Accordingly, the position detector 56 can be any device capable of providing a signal indicative of the motion of the motor 58 such as, for example, an encoder or the like. In some embodiments, the position detector 56 can comprise an optical reflective sensor 58 configured to detect motion of a circular disk 60. Specifically, the optical reflective sensor 58 can be located proximate to the circular disk 60 such as, for example, offset by about one millimeter. Accordingly, the optical reflective sensor 58 can be responsive to the circular disk 60. The circular disk 60 can be provided with indexed features having a known relationship to motion of the circular disk 60. For example, the circular disk 60 can comprise through holes 62. It is noted that the term "sensor," as used herein, can mean a device that measures a physical quantity and encodes the measurement into a signal, which is correlated to the measured value of the physical quantity.

In some embodiments, the position detector 56 can be located proximate to the motor 38. Specifically, the optical reflective sensor 58 can be mounted to the top of the motor 38, e.g., facing upward along the drive member 40. The circular disk 60 can be attached to the drive member 40. Accordingly, the disk 60 can be configured to rotate in response to rotation of the motor 38. The rotation can cause the through holes 62 to rotate above the over the sensor 58. Thus, the optical reflective sensor 58 can provide position signals that are indicative of the rotational motion of the drive member 40 (e.g., speed, position, or the like). The position signals can be extrapolated or decoded to determine the position of the piston 44. It is noted that the position detector 56 described herein can accommodate a large range of rotation speeds, which can increase the range of opening times of the bottom loading valve 10.

Referring again to FIGS. 2 and 3, the piston 44 of the bottom loading valve 10 can be configured to translate within the valve body 22 to selectively obstruct the one or more lateral openings 122. In some embodiments, the piston 44 can be arranged to interact with the fluid passageway 120 within the valve body 22. Specifically, the cylindrical portion 26 of the valve body 22 can be configured to constrain motion of the piston 44. Accordingly, the fluid facing surface 122 of the cylindrical portion 26 of the valve body 22 can comprise one or more features that guide the translation of the piston 44.

As is noted above, force from the motor 38 can be communicated to the piston 44 via the drive member 40. In some embodiments, the piston 44 can be configured to translate in response to rotation of the drive member 40. For example, in the depicted embodiment, the drive member 40 can be aligned along and rotate with respect to an axis of rotation 130. In response, the piston 44 can translate axially, i.e., along the axis of rotation 130, to selectively obstruct the one or more lateral openings 124. Additionally, it is noted that the term "lateral," as used herein can mean a direction that is substantially orthogonal to the axis of rotation 130. Accordingly, the one or more lateral openings can be located in a position that is offset laterally from the axis of rotation 130.

According to the embodiments described herein, the drive member 40 can be in fixed and rotatable engagement with the valve body 22. It is noted that the term "fixed and rotatable engagement" can mean that a component interacts with another component such that the component is substantially free to rotate with respect to a substantially fixed axis. For example, in the depicted embodiment, the drive member 40 can extend through the fluid passageway 120 along the axis of rotation 130. The drive member 40 can span the fluid passageway 120 from the motor 38 to a valve cap 28, which can axially limit the extent of the cylindrical portion 26 of the valve body 22. The drive member 40 can be in fixed and rotatable engagement with the valve cap 28. For example, the drive member 40 can be in fixed and rotatable engagement with the valve cap 28 by disposing an upper end of drive member 40 within an opening 48 formed in the inner surface of the valve cap 28. Alternatively or additionally, the drive member 40 can be in fixed and rotatable engagement with a motor housing 24 of the valve body 22, which can be configured to retain the motor 38 in alignment with the axis of rotation 130.

The piston 44 can be in threaded engagement with the threaded portion 42 of the drive member 40. Accordingly, the piston 44 can be axially offset from the motor 38. In some embodiments, the hub 50 can be in substantially fixed engagement with a threaded member 46 such as, for example, a lead screw nut, or the like. Optionally, the threaded member 46 can be formed integrally with the hub 50 of the piston 44. Accordingly, rotation of the drive member 44 can be transformed into translation of the piston 44.

Referring still to FIGS. 2 and 3, the bottom loading valve 10 can comprise an anti-rotation member 52 configured to mitigate rotational motion of the piston 44 as the motor is communicating force to the piston 44. The anti-rotation member 52 can be coupled to the valve body 22 and held substantially fixed. The anti-rotation member 52 can constrain the rotation of the piston 44. In one embodiment, the anti-rotation member 52 can comprise an outer surface with a substantially square cross-section configured for contacting the piston 44. For example, the anti-rotation member 52 can be positioned within a pressure balancing orifice of the piston 44 such that the low drag spokes 128 and the anti-rotation member 52 interact to mitigate rotation. Specifically, the anti-rotation member 52 can extend into the fluid passageway 120 from the valve cap 28 and into the contact with a low drag spoke 128.

The bottom loading valve 10 can comprise a spring 54 for biasing the bottom loading valve 10 to the closed position (FIG. 2). Accordingly, the spring 54 can be configured to automatically close the bottom loading valve 10 should the motor 38 lose power or cease operation. In some embodiments, the spring 54 can be placed into contact with the valve cap 28 and disposed within the piston 44. For example, the spring 54 can be constrained within the piston 44 by the sealing member 126 and the low drag spokes 128. Accordingly, as the spring 54 is compressed against the valve cap 28 by the low drag spokes 128, the spring 54 can increasingly exert downward pressure against the piston 44.

Figure 6:
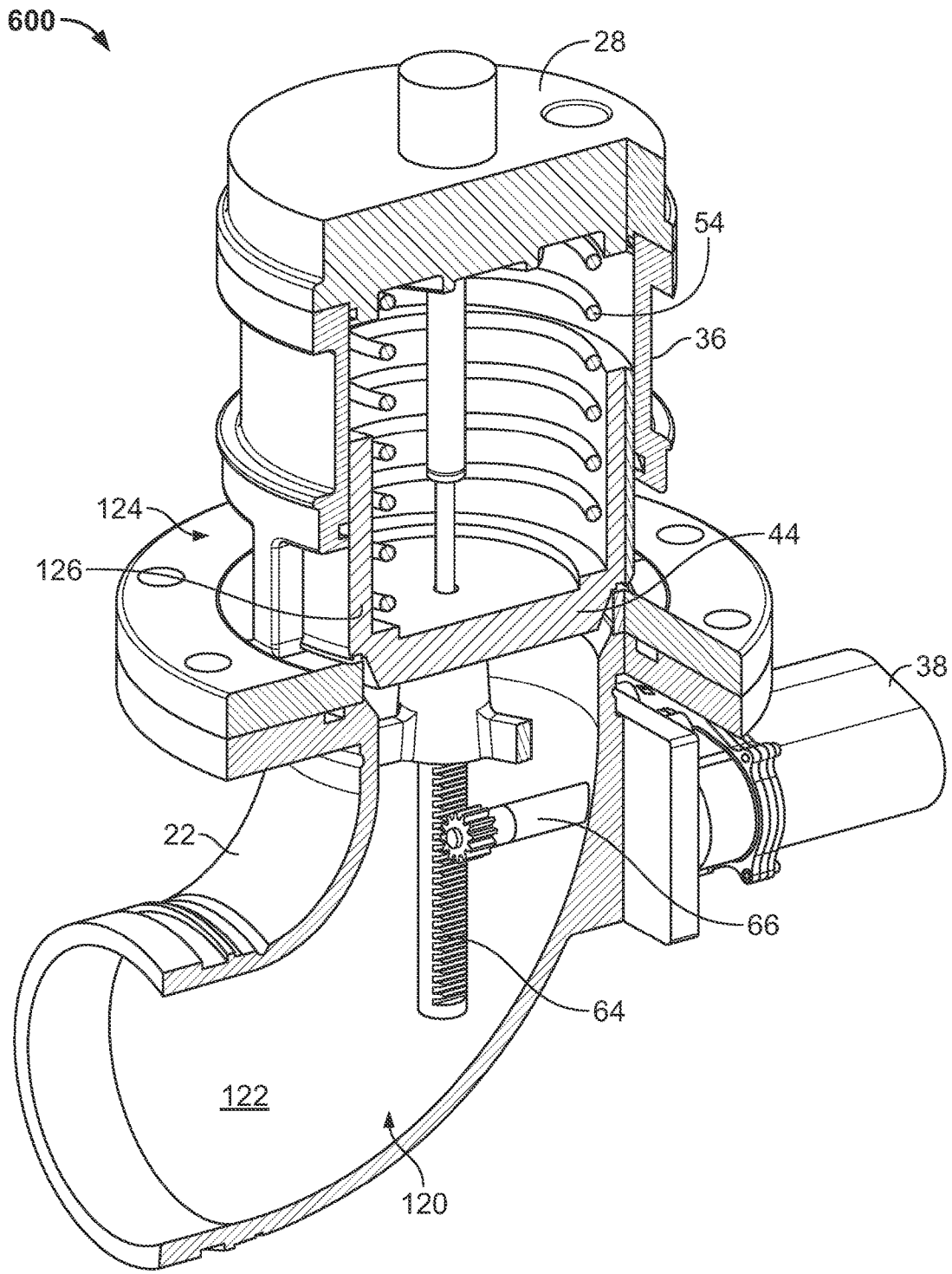
FIG. 6 is another embodiment of a bottom loading valve for use in the tank management system.

Referring now to FIG. 6, according to the embodiments described herein, a bottom loading valve 600 can comprise a drive member formed from a rack 64 and pinion 66. Specifically, the pinion 66 can be operably coupled to the motor 38 and the rack 64, such that rotational motion applied to the pinion 66 translates the rack 64. The rack 64 can be coupled to the piston 44. Accordingly, translation of the rack 64 can cause a corresponding translation of the piston 44. Thus, the sealing member 126 of the piston 44 can selectively obstruct the one or more lateral openings 124 of the valve body 22.

Figure 7:
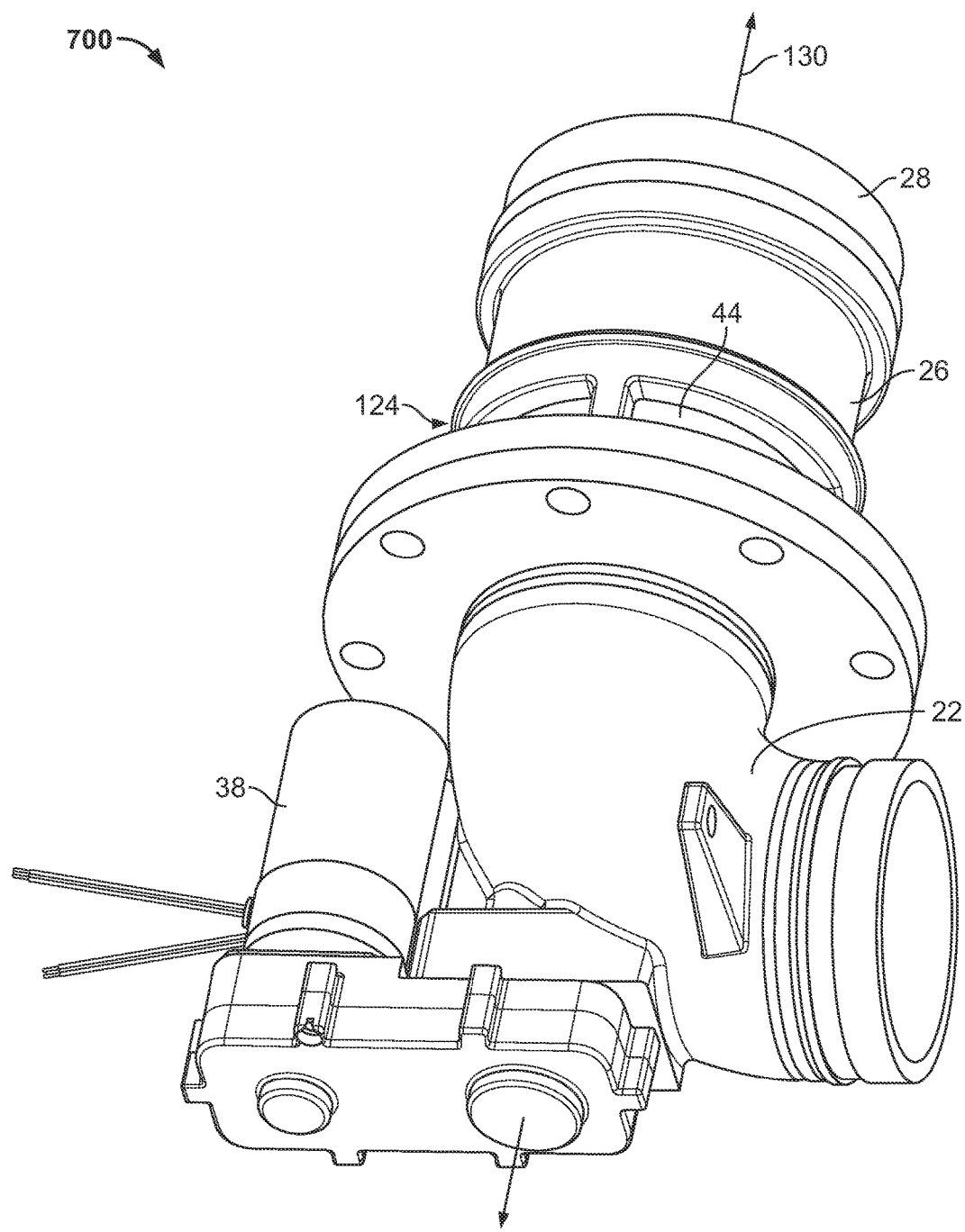
FIG. 7 is another embodiment of a bottom loading valve for use in the tank management system.
Figure 8:
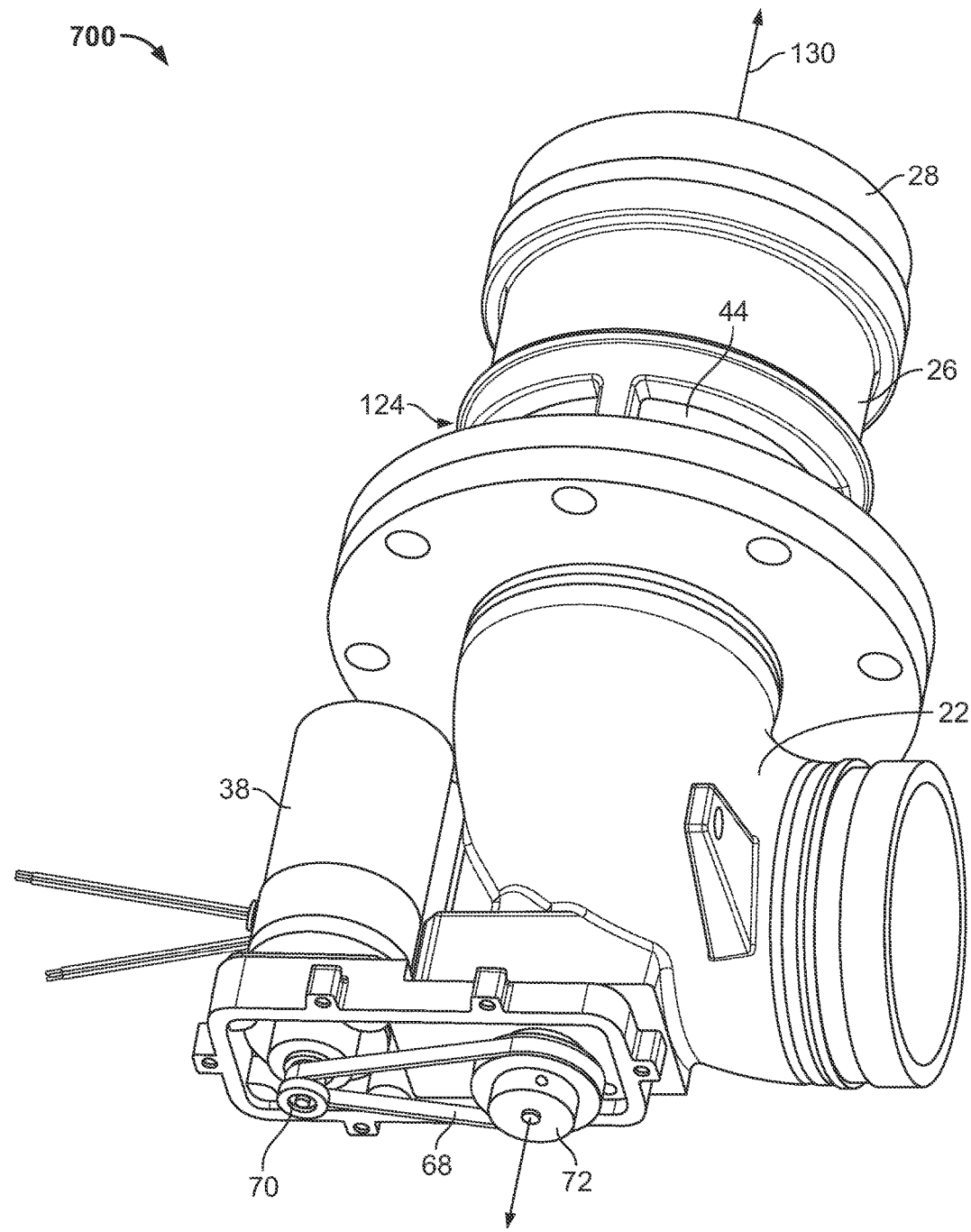
FIG. 8 is another embodiment of a bottom loading valve for use in the tank management system.

Referring now to FIGS. 7 and 8, a bottom loading valve 700 can comprise a motor 38 that is offset from the axis of rotation 130. In some embodiments, the bottom loading valve 700 can comprise a timing belt 68 and pulley system. Specifically, the motor 38 can be operably coupled to a pulley 70 such that the pulley 70 can be rotated by actuation of the motor 38. A pulley 72 can be aligned with the axis of rotation 130 and configured to communicate force to the piston 44 such as, for example, via the drive member 40 (FIG. 3). The timing belt 68 can be operably coupled to the pulley 70 and the pulley 72 and span the distance between the pulley 70 and the pulley 72. Accordingly, the timing belt 68 can communicate force supplied by the motor 38 to the pulley 72 via rotation of the pulley 70.

Referring again to FIGS. 2 and 3, the motor 38 can be electronically activated to cause the motor 38 to selectively rotate the drive member 40 with respect to the axis of rotation 130 in a closing direction or an opening direction. Accordingly, the piston 44 can be actuated to selectively obstruct the one or more lateral openings 124. Specifically, the piston 44 can be actuated to the closed position (FIG. 2), such that the piston 44 fully obstructs the one or more lateral openings 124 from the fluid passageway 120. It is noted that the phrase "fully obstruct," as used herein, can mean that an opening is substantially sealed to prevent fluid flow. Thus, when in the closed position, the piston 44 can substantially prevent fluidic communication via the one or more lateral openings 124. In the depicted embodiment, the sealing member 126 of the piston 44 can separate the fluid passageway 120 from the one or more lateral openings 124. Additionally, the sealing member 126 can span the one or more lateral openings 126 from the interior of the valve body 22. Accordingly, in some embodiments, the sealing member 126 can be larger than the one or more lateral openings 124 with respect to the axial direction.

As shown in FIG. 3, when the piston 44 is moved to an open position such that the one or more lateral openings 124 are partially obstructed or completely unobstructed, fluid can be communicated via the one or more lateral openings 124. Specifically, starting from the closed position (FIG. 2), the motor 38 can selectively rotate the drive member 40 with respect to the axis of rotation 130 in the opening direction. As the drive member 40 rotates in the opening direction, the piston 44 can be translated by the threaded engagement formed with the drive member 40. The anti-rotation member 52 can mitigate rotation of the piston 44 to improve the efficiency of the translation. Translation of the piston 44 can cause the sealing member 126 to reveal the one or more lateral openings 124 to the fluid passageway 120. Accordingly, rotation of the drive member 40 in the opening direction can transition the one or more lateral openings 124 from being completely obstructed by the sealing member 126 to being partially obstructed or completely unobstructed. Additionally, it is noted that the one or more lateral openings 124 can be transitioned from being completely unobstructed by the sealing members 126 to being partially obstructed or completely obstructed by rotating the drive member 40 in the closing direction, which can cause the piston 44 to translate in the opposite direction in a manner as described above with respect to opening.

As is noted above, the spring 54 can be compressed as the piston 44 translates to open the bottom loading valve 10. Accordingly, should power to the motor 38 be discontinued, the energy stored in the spring 54 can cause the piston 44 to move back to the closed position. As the piston 44 translates, the drive member 40 can rotate in the closing direction due to the force exerted upon the piston 44 by the spring 54. Thus, the bottom loading valve 10 can be automatically closed in the event of power loss. Additionally, it is noted that the pressure balancing orifices of the piston 44 can allow fluid to flow through the piston 44 to achieve an immediate pressure balance on both sides of the piston 44. Accordingly, resistance of the fluid to translation of the piston 44 can be reduced. Moreover, the shape of the low drag spokes 128 can be configured to reduce friction between the piston 44 and fluid in the fluid passageway 120 as the piston 44 translates to close the bottom loading valve 10. As a result, the amount of spring force needed to close the bottom loading valve 10 can be reduced and the response time of the piston 44 during automatic closure can be improved. Alternatively or additionally, the bottom loading valve 10 may also have a failsafe mechanism that closes the bottom loading valve 10 to prevent flow of fluid if a nozzle is not connected to the bottom loading valve 10. Accordingly, in embodiments wherein the bottom loading valve 10 is utilized with a fuel tank, unintended dumping of fuel can be prevented.

Referring again to FIG. 1, the system 100 can comprise a vent valve 12 for regulating the pressure contained within a tank 20, which can be any pressure vessel suitable for the storage of fluids. The vent valve 12 can be configured to be actuated throughout a venting position and a non-venting position. When in the venting position, the vent valve 12 can be opened to communicate fluid such as, for example, the gas phase of substances stored in the tank 20. When in the non-venting position, the vent valve 12 can be closed to mitigate the communication of fluid. In some embodiments, the vent valve 12 can be electrically actuated. Accordingly, the vent valve 12 can comprise a servo-mechanism suitable for actuation throughout the venting position and the non-venting position such as, for example, electrically driven motors, solenoids, or the like. Moreover, the vent valve 12 can be configured to communicate a vent position signal indicative of actuation of the vent valve. For example, the vent valve 12 can comprise positional sensors configured to detect the position of the vent valve 12 such as, but not limited to, two position switches, proximity sensor, or the like.

The system 100 can comprise a fuel level sensor 14 for detecting and communicating an amount of fuel contained within the tank 20. The fuel level sensor 14 can comprise a robust gauging system configured to detect a standard "fill" level and a "high fill" level. The fuel level sensor 14 can communicate a fuel level signal indicative of an amount of fuel contained by the tank 20. In some embodiments, the fuel level sensor 14 can be configured to be mounted to the top of the tank 20. The fuel level sensor 14 can comprise a portion configured to rest at the bottom of the tank 20 and measure the head pressure of the fluid in the tank 20, which can be utilized to determine a volume contained by the tank 20.

The system 100 can comprise a pressure sensor 16 for detecting and communicating an amount of pressure contained within a vessel. Specifically, the pressure sensor 16 can detect an amount of force and communicate a pressure signal indicative of the detected amount of force. It is noted that the term "signal" can mean a waveform (e.g., electrical, optical, magnetic, or electromagnetic), such as DC, AC, sinusoidal-wave, triangular-wave, square-wave, and the like, capable of traveling through a medium.

The system 100 can comprise a controller 18 configured to direct the operations of the various system components. The controller 18 can comprise one or more processors that execute machine readable instructions and a memory for storing machine readable instructions. The one or more processors can be communicatively coupled to the memory. The one or more processors can comprise an integrated circuit, a microchip, a computer, or any other computing device capable of executing machine readable instructions. The memory can be RAM, ROM, a flash memory, a hard drive, or any device capable of storing machine readable instructions. Additionally, the controller 18 can comprise one or more input device 132 for receiving tactile input from an operator such as, for example, a button, knob, touch screen, or the like. The one or more input device 132 can be communicatively coupled to the one or more processors such that the received tactile input can be transformed into signals indicative of a desired command.

In the embodiments described herein, the one or more processors and the memory may be integral with the controller 18. However, it is noted that the controller 18, the one or more processors, and the memory may be discrete components communicatively coupled with one another without departing from the scope of the present disclosure. Thus, embodiments of the present disclosure may comprise logic or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either a field-programmable gate array (FPGA) configuration or an application-specific integrated circuit (ASIC), or their equivalents.

Referring collectively to FIGS. 1-3, the system 100 can be configured to manage fuel contained within the tank 20. The bottom loading valve 10 can be mounted to the bottom of the tank 20 and configured to control the ingress and egress of fluid with respect to the bottom of the tank 20. In some embodiments, a fluid port 30 of the bottom loading valve 10 can be in fluidic communication with a nozzle adapter 136, which is configured to be coupled to a fuel nozzle. The cylindrical portion 26 of the bottom loading valve 10 can be disposed within the tank 20, such that the one or more lateral openings 126 of the bottom loading valve 10 are exposed to the interior of the tank 20. In some embodiments, the cylindrical portion 26 of the bottom loading valve 10 can be provided as a separate component. Specifically, the valve body 22 can comprise an exterior flange 32 and an interior flange 34. The exterior flange 32 can be coupled to the fluid port 30 and the interior flange 34 can be coupled to the cylindrical portion 26. The exterior flange 32 of the valve body 22 can be mounted to an outside surface of the tank 20 and the interior flange 34 of the cylindrical portion 26 can be mounted to an inside surface of the tank 20. Accordingly, a wall of the tank 20 can be clamped between the exterior flange 32 and the interior flange 34. Thus, the bottom loading valve 10 can be partially disposed within the tank 20 and partially disposed outside the tank 20 such that the fluid passageway 120 extends from the fluid port 30 through the cylindrical portion 26.

In order to relieve pressure within the tank 20 when fueling or defueling, the vent valve 12 can be disposed at the top of the tank 20. In some embodiments, each of the bottom loading valve 10 and the vent valve 12 can be communicatively coupled to the controller 18. As used herein, the phrase "communicatively coupled" can mean that components are capable of exchanging data signals with one another such as, for example, electrical signals via conductive medium, electromagnetic signals via air, optical signals via optical waveguides, or the like. Accordingly, operation of the tank 20 and the vent valve 12 can be directed by the controller 18. Alternatively or additionally, the system 100 may also include a mechanical linkage between the bottom loading valve 10 and the vent valve 12.

As is noted herein, the system 100 may be used to on-load, off-load, or recirculate fuel within the tank 20. In accordance with the embodiments described herein, the controller 18 can execute machine readable instructions to automatically implement methods to perform on-loading, off-loading, recirculating, or combinations thereof.

According to the embodiments described herein, on-loading can be performed to add fuel to the tank 20. The system 100 can be configured to perform a pressure check that determines the pressure upstream of the bottom loading valve 10 with the pressure sensor 16. Accordingly, the pressure sensor 16 can be communicatively coupled to the controller 18, and can be disposed between the fluid port 30 of the bottom loading valve 10 and the nozzle adapter 136. The pressure sensor 16 can communicate the pressure signal to the controller 18. The controller 18 can determine that the pressure check is satisfied when the pressure signal corresponds to a pressure that meets a minimum threshold of pressure (e.g. about 10 PSI). Accordingly, the controller 18 can determine, from the pressure check, that fuel pressure is provided in the system 100.

Referring still to FIGS. 1-3, the system 100 can be configured to perform a fuel level check that determines an amount of fuel located within the tank 20 using the fuel level sensor 14. Accordingly, the fuel level sensor 14 can communicate the fuel level signal to the controller 18. The controller 18 can determine that the fuel level check is satisfied when the fuel level signal corresponds to an amount of fuel that is less than the full capacity of the tank 20. Accordingly, the controller 18 can determine, from the fuel level check, that the tank 20 is not already full, i.e., that the tank 20 has available capacity to store additional fuel.

The system 100 can be configured to transition the vent valve 12 from the non-venting position to the venting position prior to adding fuel to the tank 20. In some embodiments, the vent valve 12 can be transitioned from the non-venting position to the venting position after the pressure check, the fuel level check, or both are satisfied. To vent the tank 20, the controller 18 can send a control signal to the vent valve 12. In response to the control signal the vent valve 12 can transition to the venting position, i.e., a vent can be opened. The controller 18 can monitor the vent position signal to determine the response of the vent valve to the control signal.

In some embodiments, the controller 18 can be configured to maintain the bottom loading valve 10 in the closed position as a default. The bottom loading valve 10 can be maintained in the closed position until the controller 18 determines that the system 100 is prepared for on-loading. Specifically, the controller 18 can determine that the system 100 is prepared for on-loading when the pressure check and the fuel level check are satisfied. Alternatively or additionally, the controller 18 can verify that the vent valve 12 is in the venting position. Upon determining that the system 100 is prepared for on-loading, the controller 18 can communicate an actuation signal to the bottom loading valve 10. The actuation signal can be encoded to indicate motor parameters such as, for example, torque, speed, or the like. The bottom loading valve 10 can receive the actuation signal. In response to the actuation signal, the motor 38 of the bottom loading valve 10 can activated to actuate the piston 44 to the open position. Specifically, the sealing member 126 can be translated away from the one or more lateral openings 124 to allow fuel to travel through the bottom loading valve 10 and into the tank 20. Once bottom loading valve 10 is fully open, which can be measured by the position detector 56, the controller 18 can cause the motor 38 to decelerate the motion of the piston 44 and hold the piston 44 in the open position (i.e., the hold phase).

During fueling, the controller 18 can monitor the system 100 to assure that the operations are being performed appropriately. For example, the controller 18 can perform periodic fault monitoring checks with a predetermined frequency. In some embodiments, the controller 18 can monitor signals to or from the bottom loading valve 10, the vent valve 12, the fuel level sensor 14, the pressure sensor 16, or any combination thereof. For example, during actuation or the hold phase of the bottom loading valve 10, the controller 18 can monitor the current supplied to the motor 38 in order to detect stall or fault conditions. If the controller 18 detects stall or fault conditions, the controller 18 can deactivate the motor 38 to mitigate damage, or to prevent excessive heat buildup. Additionally, it is noted that, the controller 18 can be communicatively coupled to components via conductive wires. In some embodiments, the control signals may be isolated from other signals in order to mitigate cross talk or noise. For example, additional ground lines can be utilized to isolate the analog signals of the motor 38 and control signals.

Upon the completion of the on-loading process, the bottom loading valve 10 can be closed. In some embodiments, the controller 18 can determine that the on-loading process is complete by monitoring the fuel level sensor 14. Specifically, the controller 18 can determine from the fuel level signal of the fuel level sensor 14 that the tank 20 is at capacity or some other desired level. Alternatively or additionally, input can be received via the one or more input device 132 to stop the on-loading process. For example, the operation can be manually stopped by the operator actuating the one or more input device 132. Upon the controller 18 determining that the on-loading process is complete, the controller 18 can provide control signals that cause the bottom loading valve 10 to close. For example, the bottom loading valve 10 can be closed by reducing the current supplied to the motor 38 and allowing the spring force of the spring 54 to back drive the bottom loading valve 10 to the closed position. Alternatively or additionally, the bottom loading valve 10 can be closed by rotating the drive member 40 in the closing direction with the motor 38. Upon the controller 18 determining that the on-loading process is complete, the controller 18 can also provide control signals that cause the vent valve 12 to transition from the venting position to the non-venting position for a predetermined amount of time after the bottom loading valve 10 is closed.

According to the embodiments described herein, off-loading can be performed to remove fuel from the tank 20. In some embodiments, the system 100 can be configured to prevent unintended removal of fuel from the system 100. Specifically, nozzle adapter 136 can be configured to remain closed until a fuel nozzle engages with the nozzle adapter 136.

The controller 18 can be configured to perform a nozzle cycle check. During the nozzle cycle check, the controller 18 can generate control signals that cause the bottom loading valve 10 to open and the vent valve 12 to move the venting position contemporaneously, while the nozzle adapter 136 is closed. The controller 18 can generate control signals that cause the bottom loading valve 10 to close and the vent valve 12 to move to the non-venting position using a powered operation. Optionally, during the nozzle cycle check, the controller 18 can generate control signals that cause the bottom loading valve 10 to open and the vent valve 12 to move the venting position. The fail safe operation of the bottom loading valve 10 can be tested by simulating an unpowered condition and determining if the bottom loading valve 10 closes without power. Similarly, fail safe operation of the vent valve 12 can be tested by simulating an unpowered condition and determining if the vent valve 12 closes without power. Should operation of the bottom loading valve 10 and the vent valve 12 perform as expected, the nozzle cycle check can be determined by the controller 18 as being completed successfully.

In some embodiments, the off-loading operation can be started by the controller 18. Input can be received via the one or more input device 132 to start the off-loading process. For example, the operation can be manually started by the operator actuating the one or more input device 132. In some embodiments, upon starting the off-loading process, the controller 18 can first perform the nozzle cycle check. In some embodiments, the input received via the one or more input device 132 to start the off-loading process can replace the pressure sensor 16, i.e., the controller 18 can ignore the pressure signal during the off-loading process. The controller 18 can end the off-loading process if the nozzle cycle check is determined by the controller 18 as being completed unsuccessfully.

Referring again to FIG. 1, the system 100 can comprise an interlock 132 configured to detect whether the fuel nozzle is removed from a holder or engaged with the system 100. The interlock 132 can be communicatively coupled to the controller 18. Accordingly, the interlock 132 can provide an interlock signal indicative of the positioning of the fuel nozzle. The controller 18 can determine from the interlock signal that the fuel nozzle is disengaged from the system 100 (e.g., the nozzle adapter 136). The controller 18 can end the off-loading process if the fuel nozzle is determined as being disengaged from the system 100.

Referring collectively to FIGS. 1-3, the controller 18 can further execute the off-loading process by causing the bottom loading valve 10 to open and the vent valve 12 to move to the venting position, as described herein. Additionally, the controller 18 can perform periodic fault monitoring checks during the off-loading process.

Once the controller 18 has determined that a desired amount of fuel has been removed from the tank 20, the controller 18 can cause the bottom loading valve 10 to close, as described herein. In some embodiments, the controller 18 can determine that the desired amount of fuel has been removed by monitoring the fuel level signal of the fuel level sensor 14. Alternatively or additionally, input can be received via the one or more input device 132 to stop the off-loading process.

According to the embodiments described herein, recirculation can be performed to recirculate the fuel of the tank 20. The recirculation operation can be started by the controller 18. Input can be received via the one or more input device 132 to start the recirculation process. For example, the operation can be manually started by the operator actuating the one or more input device 132. In some embodiments, upon starting the recirculation process, the controller 18 can first perform the nozzle cycle check. In some embodiments, the input received via the one or more input device 132 to start the recirculation process can replace the pressure sensor 16, i.e., the controller 18 can ignore the pressure signal during the recirculation process.

The controller 18 can end the recirculation process if the nozzle cycle check is determined by the controller 18 as being completed unsuccessfully. Alternatively or additionally, the controller 18 can end the recirculation process if the fuel nozzle is determined as being disengaged from the system 100.

During the recirculation process, the controller 18 can monitor the fuel level signal of the fuel level sensor 14 to ensure the tank 20 is not exceeding capacity. For example, the controller 18 can check the "high fill" level on the fuel level sensor 14 to ensure the tank 20 is not exceeding capacity. The controller 18 can ignore the "fill" level of the fuel level sensor 14. The controller 18 can end the recirculation process if the fuel level signal indicates that the tank 20 is exceeding capacity. The controller 18 can further execute the recirculation process by causing the bottom loading valve 10 to open and the vent valve 12 to move to the venting position, as described herein. Additionally, the controller 18 can perform periodic fault monitoring checks during the recirculation process.

Once the controller 18 has determined that the recirculation process is complete, the controller 18 can cause the bottom loading valve 10 to close, as described herein. For example, input can be received via the one or more input device 132 to stop the recirculation process.

It should now be understood that the bottom loading valves described herein can be utilized to perform on-loading, off-loading or recirculation operations. The bottom loading valves can be electrically operated and configured to perform operations according to a controller. Accordingly, the bottom loading valves described herein can be incorporated into systems and perform methods without the use of a secondary air source, and associated tubing and brackets, that traditionally would have been used to operate a bottom loading valve and tank vent valve. As a result, embodiments of the present disclosure can be relatively simple to install and maintain compared to systems with secondary air sources. Moreover, the embodiments described herein can operate in colder conditions and with improved reliability compared to systems with secondary air sources.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Additionally, to the extent that the terms "on" or "onto" are used in the specification or the claims, it is intended to additionally mean "in," "into," or "near." Furthermore, to the extent the term "connect" is used in the specification or claims, it is intended to mean not only "directly connected to," but also "indirectly connected to" such as connected through another component or components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Accordingly, a quantitative representation preceded by the term "about" should be understood to include the exact quantity in addition to a functionally equivalent range surrounding the exact quantity.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tank management system comprising:
   a tank surrounding an interior;
   a vent valve coupled to the tank that actuates throughout a venting position and a non-venting position, wherein the vent valve communicates a vent position signal indicative of actuation of the vent valve; and
   a bottom loading valve coupled to the tank, the bottom loading valve comprising a valve body that defines a fluid passageway and one or more lateral openings and a motor that moves a piston throughout an open position and a closed position, wherein, when the piston is in the closed position, the piston fully obstructs the one or more lateral openings from the fluid passageway; and
   a controller communicatively coupled to the vent valve and the bottom loading valve, wherein the controller executes machine readable instructions to:
   cause the vent valve to actuate to the venting position;
   receive the vent position signal;
   respond to the vent position signal by causing the piston of the bottom loading valve to move to the open position if the vent position signal indicates that the vent valve is in the venting position.

2. The tank management system of claim 1 wherein the controller executes machine readable instructions to:
   cause the piston of the bottom loading valve to move from the closed position to the open position contemporaneously to actuation of the vent valve from the non-venting position to the venting position.

3. The tank management system of claim 1 wherein the controller executes machine readable instructions to:
cause the piston of the bottom loading valve to move to the open position after the vent valve is actuated to the venting position.

4. The tank management system of claim 3, wherein the controller executes the machine readable instructions to:
cause the piston of the bottom loading valve to move to the closed position; and
cause the vent valve to actuate from the venting position to the non-venting position a predetermined amount of time after the piston of the bottom loading valve is moved to the closed position.

5. The tank management system of claim 3, further comprising a fuel level sensor communicatively coupled to the controller, wherein the controller executes the machine readable instructions to:
receive a fuel level signal from the fuel level sensor that is indicative of an amount of fuel contained by the tank; and
determine that the tank has additional capacity, wherein the piston of the bottom loading valve is moved to the open position after the additional capacity is determined.

6. The tank management system of claim 3, further comprising a pressure sensor disposed upstream of the bottom loading valve and communicatively coupled to the controller, wherein the controller executes the machine readable instructions to:
receive a pressure signal from the pressure sensor indicative of an upstream pressure; and
determine that a pressure check is satisfied when the upstream pressure meets a minimum threshold pressure, wherein the piston of the bottom loading valve is moved to the open position after the pressure check is satisfied.

7. A tank management system comprising:
a tank surrounding an interior;
a vent valve coupled to the tank that actuates throughout a venting position and a non-venting position, wherein the vent valve communicates a vent position signal indicative of actuation of the vent valve;
a bottom loading valve coupled to the tank, the bottom loading valve comprising a valve body that defines a fluid passageway and one or more lateral openings and a motor that moves a piston throughout an open position and a closed position, wherein, when the piston is in the closed position, the piston fully obstructs the one or more lateral openings from the fluid passageway; and
a controller communicatively coupled to the vent valve and the bottom loading valve, wherein the controller executes machine readable instructions to:
cause the vent valve to actuate to the venting position;
receive the vent position signal;
determine that the vent valve is in the venting position from the vent position signal; and
cause the piston of the bottom loading valve to move to the open position after the vent valve is determined as being in the venting position.

8. The tank management system of claim 7, wherein the controller executes the machine readable instructions to:
cause the piston of the bottom loading valve to move to the closed position; and
cause the vent valve to actuate from the venting position to the non-venting position a predetermined amount of time after the piston of the bottom loading valve is moved to the closed position.

9. The tank management system of claim 8, further comprising a fuel level sensor communicatively coupled to the controller, wherein the controller executes the machine readable instructions to:
receive a fuel level signal from the fuel level sensor that is indicative of an amount of fuel contained by the tank; and
determine that the tank has additional capacity, wherein the piston of the bottom loading valve is moved to the open position after the additional capacity is determined.

10. The tank management system of claim 8, further comprising a pressure sensor disposed upstream of the bottom loading valve and communicatively coupled to the controller, wherein the controller executes the machine readable instructions to:
receive a pressure signal from the pressure sensor indicative of an upstream pressure; and
determine that a pressure check is satisfied when the upstream pressure meets a minimum threshold pressure, wherein the piston of the bottom loading valve is moved to the open position after the pressure check is satisfied.

* * * * *